Figure 1:
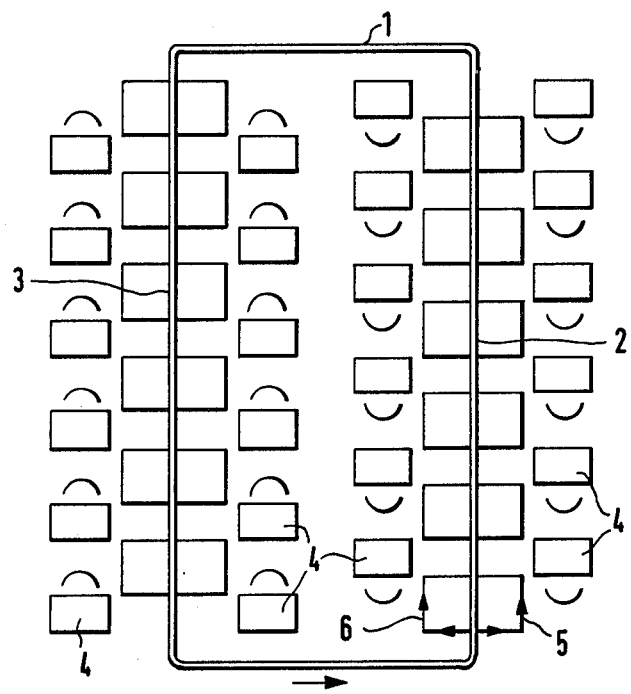

United States Patent [19]

Östlund

[11] 4,372,218

[45] Feb. 8, 1983

[54] TRANSPORTATION INSTALLATION

[75] Inventor: Roland J. A. Östlund, Limmared, Sweden

[73] Assignee: Jobmatic, Inc., Bellevue, Wash.

[21] Appl. No.: 821,076

[22] Filed: Aug. 2, 1977

Related U.S. Application Data

[63] Continuation of Ser. No. 677,738, Apr. 16, 1976, abandoned.

[30] Foreign Application Priority Data

Nov. 12, 1975 [SE] Sweden .............................. 7512683

[51] Int. Cl.³ .............................................. B61J 3/00
[52] U.S. Cl. ..................................... 104/88; 104/91;
104/103; 198/352
[58] Field of Search ..................... 104/88, 89, 91, 103,
104/130; 246/434; 198/339, 341, 351, 352, 354,
348, 355; 214/11 R

[56] References Cited

U.S. PATENT DOCUMENTS

| | | | |
|---|---|---|---|
| 2,918,881 | 12/1959 | Klamp et al. | 104/88 |
| 2,989,928 | 6/1961 | Fletcher et al. | 104/88 |
| 3,140,669 | 7/1964 | Parker | 104/88 |
| 3,194,177 | 7/1965 | Bishop | 104/88 |
| 3,605,628 | 9/1971 | McElroy | 104/89 |
| 3,673,967 | 7/1972 | Kropf | 104/88 |
| 3,999,730 | 12/1976 | Gonsalves et al. | 246/434 |

Primary Examiner—Charles E. Frankfort

[57] ABSTRACT

A conveyor system for serving a plurality of processing stations having a plurality of trolley carriages, an overhead main conveyor comprising a monorail track for the trolley carriages, and forming a loop having a pair of substantially parallel sides along which the processing stations are distributed, a cable or chain for propelling the trolley carriages along the track, a plurality of side conveyors coordinated with the processing stations. Each of the side conveyors comprises a loop shaped overhead monorail track, and switches for selectively connecting the side conveyors to the main conveyor, including, for each of the side conveyors, a first switch arranged in a first position to lead a trolley carriage along the main conveyor and in a second position to deviate a trolley carriage from the main conveyor to one end of a side conveyor, and a second switch for connecting the other end of the side conveyor to the same side of the main conveyor as the first switch.

8 Claims, 10 Drawing Figures

TRANSPORTATION INSTALLATION

This is a continuation of application Ser. No. 677,738, filed Apr. 16, 1976, now abandoned.

The present invention relates to a transportation installation for serving a number of processing stations. As a processing station is meant any working station, where a working piece or an object or a group of such objects shall be subjected to a working operation (by way of example machining, mounting, surface treatment, inspection, classification, marking etc.) or only be stored. More particularly the invention relates to a transportation installation comprising for one thing a main conveyor forming a loop exhibiting two substantially parallel sides, along which the processing stations are distributed, and which is designed as a suspended conveyor provided with a guide rail for transportation carriages and with a transportation-cable or chain placed in guiding means above the guide rail and following the path of the same, which cable or chain is provided with downwards pointing suspension means for the transportation carriages, and for another thing with a number of side conveyors, each one for its particular processing station, each side conveyor comprising a guide rail, which at its input end is connected with the main conveyor by means of a switch, which in a first position is arranged to lead a transportation carriage further on along the main conveyor, and in a second position to deviate the carriage to the side conveyor.

It is a principal object of the invention to provide a design of such an installation, which gives the best utilization of the floor area and in addition requires a comparatively short length of track for the main conveyor in relation to the size of the area served. It is another object of the invention to provide an improved system for the automatic guiding of the transportation carriages to the different processing stations.

What in the first place characterizes the invention is the arrangement that to each of the two parallel sides of the main conveyor a group of side conveyors to the right and a group of side conveyors to the left of the respective side, as seen in the direction of transportation, is connected.

Figure 2:
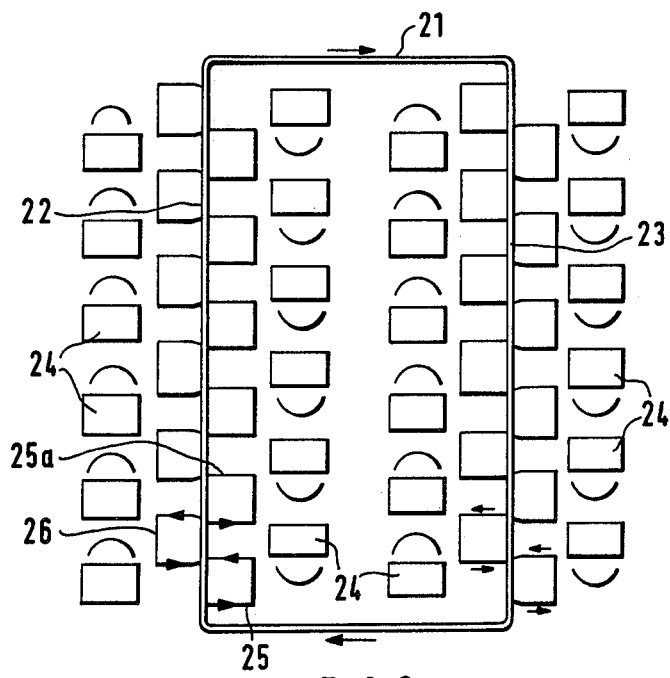
Figure 3:
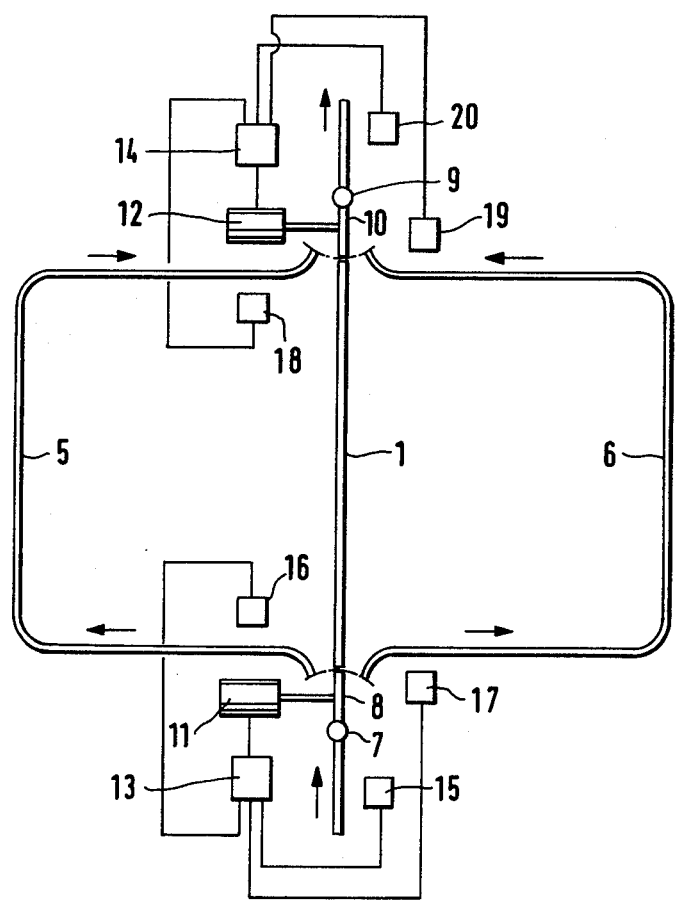
Figure 4:
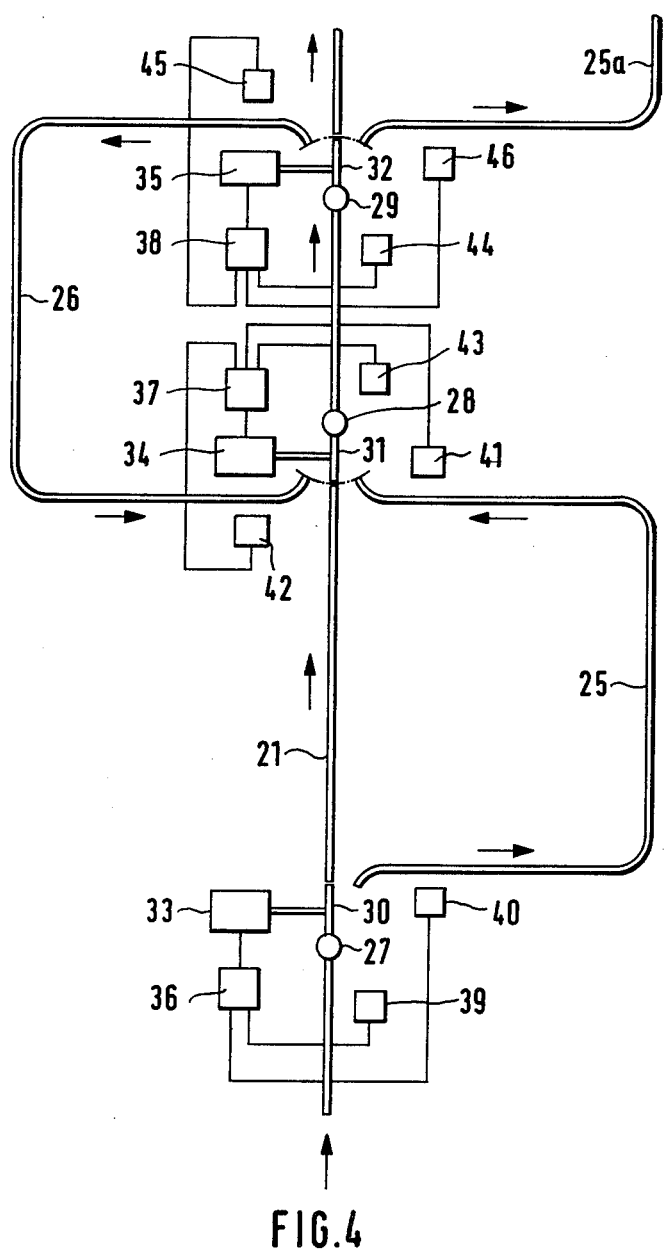
Figure 5:
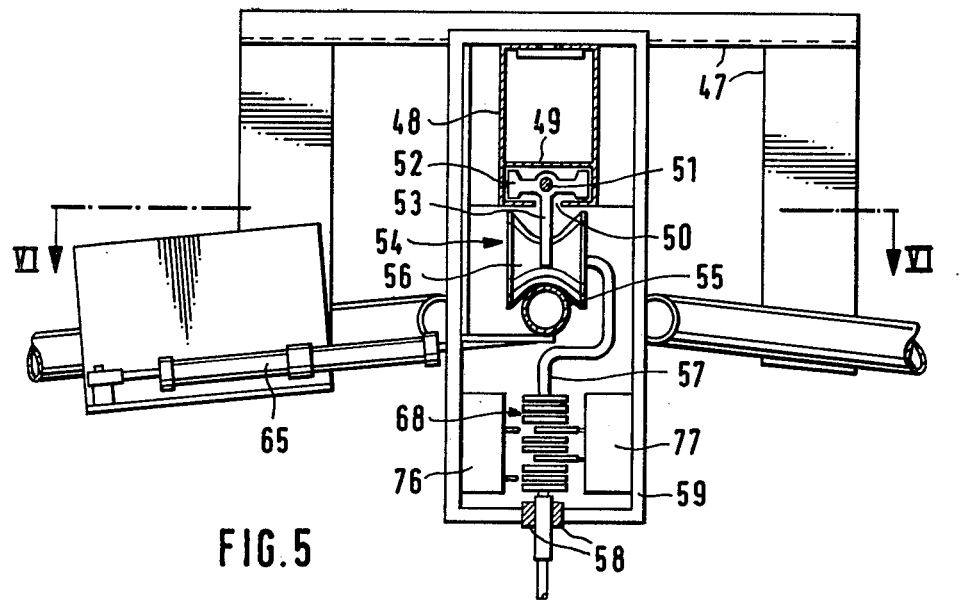
Figure 6:
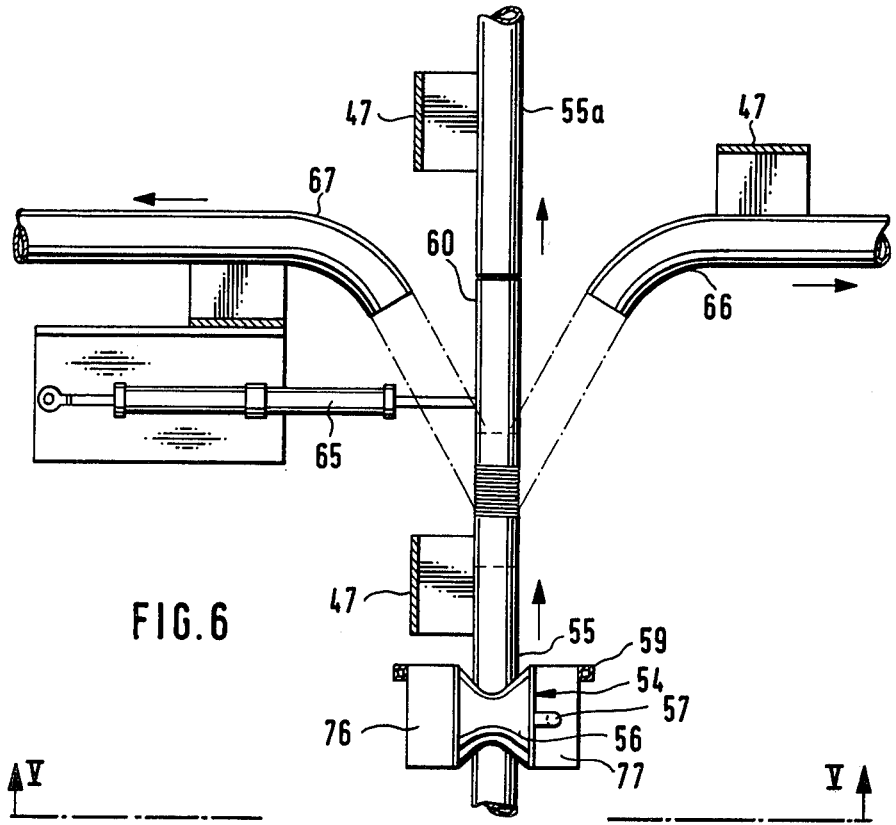
Figure 8:
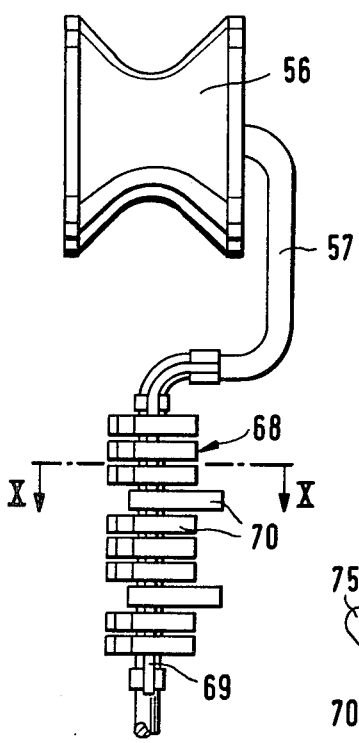
Figure 9:
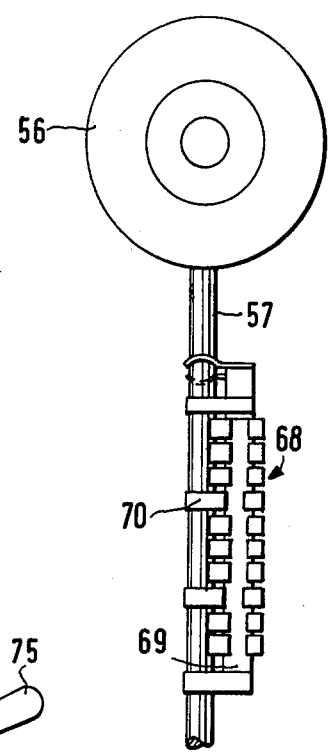
Figure 10:
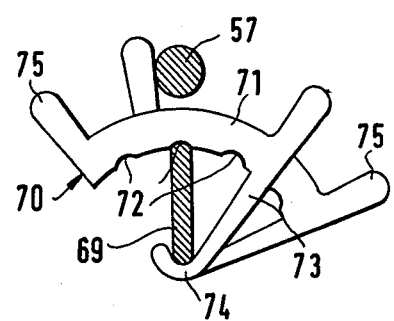
Figure 7:
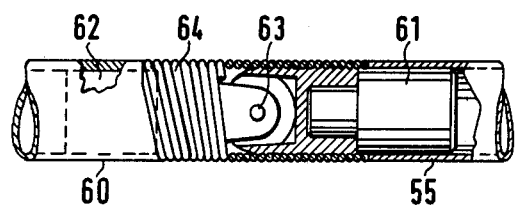

The invention will now be explained in the following more in detail, reference being made to the accompanying drawing, in which FIG. 1 is a schematical plan of a first example of embodiment of a transportation installation according to the invention, FIG. 2 is a schematical plan of a second example of embodiment of a transportation installation according to the invention, FIG. 3 is a schematical plan of a section of the installation according to FIG. 1 and a block diagram for the automatic guiding system, FIG. 4 is a schematical plan of a section of the installation according to FIG. 2 and a block diagram for the automatic guiding system, FIG. 5 is a cross-sectional view (along V—V in FIG. 6) through the conveyor with a carriage suspended in the same, FIG. 6 is a cross-sectional view along VI—VI in FIG. 5, FIG. 7 is a plan view on a larger scale than the FIGS. 5–6, partly in axial cross section, illustrating a part of the installation according to the FIGS. 5–6, FIGS. 8 and 9 are a front view and side elevational view respectively on a larger scale than the FIGS. 5–6, illustrating the visible carriage, and FIG. 10 is a cross-sectional view on a larger scale than the FIGS. 8–9 along X—X in the FIG. 8.

The transportation installation illustrated in FIG. 1 comprises a suspended conveyor 1, which forms a closed rectangular track with two parallel long sides 2, 3. Each one of these serves two rows of processing stations or working places 4, which are located pairwise right in front of each other at both sides of the conveyor. For each processing station a side conveyor extending in a U-shaped track or a side track 5 and 6 respectively is arranged for the delivery of goods to the processing stations from the conveyor 1 and vice versa, the ends of which tracks can be connected with the main conveyor each one via its switching means. These side conveyors are placed in pairwise arrangement right in front of each other on both sides of the conveyor. The directions of traffic in the installation are hinted with arrows.

The installation is provided with equipment for automatic guiding of the carriages, which permits an automatic guidance of a carriage from anyone of the side conveyors to anyone of the side conveyors. This equipment will now be described in connection with FIG. 3, which schematically illustrates a section of the main conveyor 1 with two side conveyors 5, 6 located right in front of each other. Each one of these can be connected with the main conveyor 1 by means of an input switch 7 and an output switch 9. Each one of these switches is designed as a three-position-switch, which in one of its extreme positions connects the side conveyor 6 to the main conveyor, in its other extreme position connects the side conveyor 5 to the main conveyor and in the centric position connects two sections of the main conveyor with each other. The switching tongues 8 and 10 respectively of the two switches are operated each one by means of its pneumatic cylinder 11 and 12 respectively provided with a controlling device 13 and 14 respectively. Control exciters 15, 16, 17 are connected with the controlling device 13 for the cylinder 11. The control exciter 15 is placed at the side of the track of a carriage transported on the conveyor 1 just ahead of the input switch 7 and is provided with a number of sensing organs arranged for the purpose of selectively being actuated by mechanically adjustable code elements in a selector mechanism provided on the carriage, when the latter one is passing in front of the sensing organs in question. An example of an embodiment of such a selector mechanism is described further below in connection with the FIGS. 5 and 8–10. The switch tongue is normally in its centric position. According to the setting of the code elements in the selector mechanism the control exciter 15 remains unaffected during the passage of carriages, but it can alternatively be brought to give an exciting pulse to the controlling device 13 in order to bring about a switch of the switching tongue to the right or to the left depending upon the setting of the code elements. The control exciters 16 and 17 are placed at the side of the input end of the side conveyors 5 and 6 respectively and are provided with sensing organs, which are activated, when the carriage is passing, and which in connection with their being actuated cause the control exciter 16 and 17 respectively to give a controlling pulse to the controlling device 13, which pulse brings about a resetting of the switch tongue 8 to the centric position. Said sensing organs by way of example can comprise a lever arm, which in connection with the passage of the carriage is pressed down by the wheels of the carriage or is moved aside by some portion of the same.

Control exciters 18, 19, 20 are connected with the controlling device 14 for the pneumatic cylinder 12 of the output switch 9. The control exciters 18 and 19 are placed at the output end of the side conveyor 5 and 6 respectively, and each one is provided with a sensing organ activated by the passage of the carriage, which organ, when actuated, brings the control exciter 18 and 19 respectively to give a controlling pulse to the controlling device 14, which pulse causes a resetting of the switch tongue 10 to the left and to the right respectively, so that the carriage projecting over the output end of the side conveyor 5 and 6 respectively is moved onto the track of the main conveyor. The control exciter 20 is placed at the main conveyor 1 just behind the output switch 9 and is provided with a sensing organ activated by the passage of the carriage, and which, when actuated, brings the control exciter 20 to give a controlling pulse to the controlling device 14, which brings about a resetting of the switch tongue 10 to its centric position. Like the sensing organs for the controlling exciters 16, 17 the controlling exciters 18, 19, 20 by way of example can comprise a lever arm, which at the passage of the carriage is pressed down by the wheels of the carriage or is moved aside by some portion of the carriage.

The transportation installation illustrated in FIG. 2 comprises a suspended conveyor 21, which forms a closed rectangular track with two parallel long sides 22, 23. Each one of these sides serves two rows of processing stations or working places 24, which rows are somewhat displaced in between them in the direction of transportation of the suspended conveyor, the working places in one row being located approximately in front of the interspaces between the working places in the other row. A side conveyor or side track 25 and 26 respectively extending in an U-shaped path is provided for each working place, the side conveyors 25 at one side of the main conveyor being displaced in the direction of transportation of this conveyor relative to the side conveyors 26 at the other side of the main conveyor in the same manner as the working places 24, or more exactly in such a manner that in the directions of transportation indicated with arrows the output end of each side conveyor is located right in front of the output end of a side conveyor at the other side of the main conveyor, and likewise the input end of each side conveyor is right in front of the input end of a side conveyor at the other side of the main conveyor. As a consequence of the displacement, however, the two input ends of a side conveyor located nearest to the end of each long side 22, 23 of the track of the main conveyor is not corresponded by any input end of another side conveyor located right in front of the first one. The design of the installation and the equipment for automatic guidance of the carriages is evident more in detail from the FIG. 4, which schematically illustrates a section of the main conveyor 1 with two side conveyors 25, 26 and the input end of a third side conveyor 25a.

The side conveyor 25, which is the first one in the direction of transportation along the side 22 of the main conveyor 21, can be connected with the main conveyor 21 by means of an input switch 27 and an output switch 28. The input switch 27 is a two-position switch, which in the normal condition illustrated guides an arriving carriage further along the main conveyor and in a position, where it is set to the right, leads the arriving carriage onto the side conveyor 25. The output switch 28 is a common installation for the side conveyors 25 and 26 and is designed as a three-position switch, which in an extreme position connects the output end of the side conveyor 25 with the main conveyor, in the other extreme position connects the output end of the side conveyor 26 with the main conveyor 21, and in the center position connects two sections of the main conveyor with each other. A three-position input switch 29 is provided for the side conveyor 26 and the nearest following side conveyor 25a, which switch in one extreme position connects the input end of the side conveyor 25a with the main conveyor 21, in the other extreme position connects the input end of the side conveyor 26 with the main conveyor 21, and in the center position connects two sections of the main conveyor with each other. The arrangement described with three-position input switches alternating with three-position output switches is a feature also in connection with the following side conveyors. The switch tongues 30, 31, 32 of the switches 27, 28, 29 are operated each one by its pneumatic cylinder 33, 34, 35 respectively, which are provided each one with its controlling device 36, 37, 38. Two controlling exciters 39, 40 are connected with the controlling device 36 for the cylinder 33. The controlling exciter 39 is placed at the side of the track for a carriage transported by the conveyor 21 and just ahead of the input switch 27 and is provided with a number of sensing organs arranged at the passage of the carriage selectively to be activated by mechanically adjustable code elements in a selector mechanism provided on the carriage. The switch tongue 30 normally occupies a straight-forward position. According to the setting of the code elements in the selector mechanism, the controlling exciter 39 remains unaffected during the passage of the carriage or is brought to give a controlling pulse to the controlling device 36 for the resetting of the switch tongue 30 to the right. The controlling exciter 40 is placed close to the input end of the side conveyor 25 and is provided with a sensing organ activated by the passage of the carriage, which organ, when actuated, brings the controlling exciter 40 to give a controlling pulse to the controlling device 36 in order to reset the switch tongue 30 to the illustrated neutral or straight-forward position. The last mentioned sensing organ by way of example can comprise a lever arm, which is activated at the passage of the carriage, and when actuated brings the controlling exciter 40 to give a controlling pulse to the controlling device 36 for resetting of the switch tongue 30 to the illustrated neutral or straight-forward position. The last mentioned sensing organ by way of example can comprise a lever arm, which at the passage of the carriage is pressed down by the wheels of the carriage or is moved aside by some portion of the carriage.

Three controlling exciters 41, 42, 43 are connected with the controlling device 37 for the pneumatic cylinder 34 of the switch 28, the controlling exciters 41 and 42 each one being placed close to the output end of its side conveyor 25 and 26, and the controlling exciter 43 being placed close to the main conveyor 21 just behind the switch 28. All of these three controlling exciters are provided each one with its sensing organ activated by the passage of the carriage, which organ can be designed in the same manner as the sensing organs of the controlling exciter 40. The controlling exciter 41, when actuated, gives a controlling pulse to the controlling device 37 for the resetting of the switch tongue 31 to its right position. The controlling exciter 42, when actuated, gives a controlling pulse for the resetting of the switch tongue 31 to its left position. The controlling exciter 43 when actuated gives a controlling pulse, which produces a resetting of the switch tongue to the illustrated centric position.

Three controlling exciters 44, 45, 46 are connected with the controlling device 38 for the pneumatic cylinder 35 of the switch 29. With respect to their location and function these exciters totally correspond the three signal exciters 15, 16 and 17 of the installation according to FIG. 3, and any special description is therefore not necessary.

The FIGS. 5–7 give an example of the constructive design of a transportation installation according to the invention. The cross sectional cut in the FIG. 5 is laid immediately ahead of a three-position input switch forming part of the installation, by way of example the switch 7 in FIG. 3 or the switch 29 in FIG. 4. On a supporting structure 47 a box girder 48 is attached, which girder is divided up in two longitudinally extending channels by means of a horizontal partion wall 49. The lower channel, the bottom of which exhibits a longitudinally extending slit 50, serves the purpose of guidance for a number of sliding bodies 52 distributed along an endless wire rope 51 and attached to said rope. A driving unit (not shown) provides the necessary propulsion to the rope keeping it in a continuous movement along the channel. The sliding body 52 is provided with a downwards pointing carrier projecting through the slit for the carriages 54, which are movable along the track. The carriages are supported on a tubular guide bar 55, each one comprising one single runner wheel 56 carrying a suspending bar 57, which is guided between a pair of guide rails 58 attached to frame pieces 59 attached to the supporting structure 47, of which frame pieces one is visible in the drawing. The suspending bars at their lower end in conventional manner are provided with suspending organs suitable for the goods, by way of example baskets or hooks.

The illustrated three-position switch has a switch tongue 60 comprising a tubular piece, which has the same outside diameter as the guide rail 55. In the guide rail 55 a cylindrical pin 61 is fitted, on which a cylindrical pin 62 fitted in the rear end of the switch tongue 60 is pivotably mounted by means of a vertical pivot pin 63 (FIG. 7). Round the pivoting point and the parts of the pins 61, 62 projecting outside the guide rail 55 and the tubular piece 60 respectively a tightly wound helical spring 64 is laid, which spring exhibits the same outer diameter as the tubes 55, 60. By this arrangement a smooth passage is provided for the transfer of the carriages from the guide rail 55 to the switch tongue 60.

The switch tongue by means of a pneumatic cylinder 65 can be set in three different positions, viz. a right position, in which the switch tongue connects with the input end 66 of a first side conveyor, a centric position, in which the switch tongue connects to the next section 55a of the main conveyor's guide rail, and a left position, in which the switch tongue connects to the input end 67 of a second side conveyor. These first and second side conveyors according to what has been stated above can be identical with the side conveyors 5 and 6 in the FIG. 3 or with the side conveyors 25a and 26 in the FIG. 4.

For the automatic guidance of the carriage along the track the carriage is provided with an adjustable selector mechanism 68, the design of which best is evident from the FIGS. 8–10. The selector mechanism exhibits a frame comprising a vertical ledge 69 mounted on a part of the suspending bar 57, located between the supporting wheel 56 and the guide 58 (FIG. 5). A staple of adjustable code elements 70 is thread on this ledge 69. Each one of the code elements 70 has a part 71 shaped as the sector of a circle, the inner edge of said part in a sliding manner engaging one edge of the ledge 69 and exhibiting three notches 72, which fix a right position, a neutral or inactive position, and a left position for the code element. An arm 73, which penetrates in radial direction from one end of the part 71 of the shape of the sector of a circle towards the center of the circular ring, is at its free end shaped to a hook 74, which grips around the other edge of the ledge 69. The element 70 is made of a material, by way of example a plastic, which has a sufficient resiliency to conserve the engagement between anyone of the notches 72 and the ledge 69 without impeding a manual changeover to another one of the notches. At both ends of the part 71 shaped like a sector of a circle a radially directed projection 75 is provided, which for one thing facilitates the manual changeover of the element, and for another thing functions as an actuating finger for engagement with a sensing organ placed in the same vertical position in controlling exciters arranged along the conveyor track for the different input switches, corresponding the controlling exciters 15 in the FIG. 3 or the controlling exciters 39 and 44 in the FIG. 4.

In the installation illustrated in the FIGS. 5–6 two controlling exciters 76, 77 are mounted in the frame piece 59 ahead of the three-position switch, one on each side of the track, for the selector 68. These controlling exciters are connected with a controlling device (not shown) for the pneumatic cylinder 65 and together correspond the controlling exciter 15 in the FIG. 3 or the controlling exciter 44 in the FIG. 4. The controlling exciter 77 is provided with two sensing organs and is actuated, when the passing selector has two corresponding code elements reset to the right, as is shown in FIG. 5. The controlling exciter 77 thereby gives a controlling pulse, which brings the pneumatic piston 65 to reset the switch tongue in a predetermined direction (suitably to the right). The controlling exciter 76 likewise is provided with two sensing organs and is actuated, when the passing selector has two corresponding code elements reset to the left. The controlling exciter 76 thereby gives a controlling pulse, which brings the pneumatic piston 65 to reset the switch tongue in the other direction (to the left). In FIG. 5 the controlling exciter 76 is set to correspond to another code combination than the controlling exciter 77. However, in principle nothing impedes the two controlling exciters from being set for the same combination.

Each one of the two sensing organs of the controlling exciters 76 or 77 preferably belongs to its microswitch, the two microswitches having working contacts coupled in series connected to a controlling exciter circuit, which thus is switched on, when the two sensing organs are actuated simultaneously. This arrangement is very simple and reliable in operation from a coupling technical viewpoint. In a selector with code elements, which can be reset only in one direction, the number of selections is $\frac{1}{2} \cdot n(n-1)$, where n is the number of code elements. By the selector being provided with code elements, which according to choice can be reset in two different directions a doubling of the number of possibilities of selection is obtained.

It is obvious that for the resetting of the switches instead of the pneumatic cylinders used in the examples of embodiment one can use other driving elements, by way of example solenoids or electric motors. The invention is also in other respects not limited to the described examples of embodiment, but can comprise any installation within the frame of the subsequent claims.

I claim:

1. A conveyor system for serving a plurality of processing stations arranged in a plurality of substantially parallel rows, comprising a plurality of trolley carriages, an overhead main conveyor comprising a monorail track for said trolley carriages, said track forming a loop having a pair of substantially parallel sides along which the rows of processing stations are distributed, and means for propelling the trolley carriages along said track, said propelling means including a cable or chain slidably supported in guide means provided along said track above the same and having depending dog members for engaging said trolley carriages, a plurality of side conveyors coordinated with said processing stations, each of said side conveyors comprising a loop shaped overhead monorail track, each of said substantially parallel sides of the main conveyor being associated with one group of side conveyors to the right of said side and another group of side conveyors to the left of said side, and, switch means for selectively connecting said side conveyors to the main conveyor, said switch means including, for each of said side conveyors, first switch means arranged in a first position to lead a trolley carriage along the main conveyor and in a second position to deviate a trolley carriage from the main conveyor to one end of a side conveyor, and second switch means for connecting the other end of the side conveyor to the same side of the main conveyor as said first switch means.

2. A conveyor system as claimed in claim 1, in which said first switch means include at least one three-position switch common to a pair of side conveyors comprising one side conveyor located to the right and another side conveyor located to the left of the track of the main conveyor, said three-position switch being arranged in a first position to lead an arriving carriage straight on along the main conveyor, in a second position to deviate the carriage to the track of said one side conveyor and in a third position to deviate the transportation carriage to the track of said other side conveyor.

3. A conveyor system as claimed in claim 1, in which said second switch means include a three-position switch common to a pair of side conveyors comprising one side conveyor located to the right and one side conveyor located to the left of the track of the main conveyor, said switch having a tongue the tip of which is directed against the direction of transportation of the main conveyor and the root end of which is connected with the main conveyor track.

4. A conveyor system as claimed in claim 1 in which the monorail tracks of said main conveyor as well as said side conveyors are tubular and in which said switch means each include a first and a second stationary terminal portion of the main conveyor track, said terminal portions being arranged in opposed relationship to one another, a stationary terminal portion of a side conveyor track, said last-mentioned terminal portion being arranged laterally of said second stationary terminal portion of the main conveyor track, a tubular switch tongue, a pair of pins one of which is fitted in said first stationary terminal portion and the other of which is fitted in one end of said tubular switch member, each of said pins being provided with an annular spring seat, a pivot joint having a vertical pivot pin connecting the adjacent ends of said pair of pins, a closewound helical spring engaging said spring seats and surrounding said pivot joint, and motor means for angularly displacing said tubular switch tongue from a position registering with said second terminal portion of the main conveyor track to a position registering with said terminal portion of a side conveyor track, and vice versa.

5. A conveyor system for serving a plurality of processing stations arranged in a plurality of substantially parallel rows, comprising a plurality of trolley carriages, an overhead main conveyor comprising a monorail track for said trolley carriages, said track forming a loop having a pair of substantially parallel sides along which the rows of processing stations are distributed, and means for propelling the trolley carriages along said track, said propelling means including a cable or chain slidably supported in guide means provided along said track above the same and having depending dog members for engaging said trolley carriages, a plurality of side conveyors coordinated with said processing stations, each of said side conveyors comprising a loop shaped overhead monorail track, each of said substantially parallel sides of the main conveyor being associated with one group of side conveyors to the right of said side and another group of side conveyors to the left of said side, switch means for selectively connecting said side conveyors to the main conveyor, said switch means including, for each of said side conveyors, first switch means arranged in a first position to lead a trolley carriage along the main conveyor and in a second position to deviate a trolley carriage from the main conveyor to one end of a side conveyor, and second switch means for connecting the other end of the side conveyor to the same side of the main conveyor as said first switch means, and, means for the automatic operation of said first switch means, said automatic operating means comprising switch shifting motor means, a control unit for controlling the operation of said motor means, a signal unit for activating said control unit, said signal unit being arranged at the side of the path of a carriage approaching said first switch means and having sensing members arranged in positions corresponding to a predetermined code combination, and, a selector unit provided on each of the carriages, said selector unit being provided with a set of code element members mechanically adjustable to form any selected one of a plurality of code combinations corresponding each to one of the predetermined code combinations of the sensing members of one of said signal units.

6. A conveyor system as claimed in claim 5, in which said first switch means include at least one three-position switch common to a pair of side conveyors comprising one side conveyor located to the right and another side conveyor located to the left of the track of the main conveyor, said three-position switch being arranged in a first position to lead an arriving carriage straight on along the main conveyor, in a second position to deviate the carriage to the track of said one side conveyor and in a third position to deviate the carriage to the track of said other side conveyor, and in which said selector unit comprises a support member attached to the carriage and a vertical row of code element members adjustably supported by said support member and selectively adjustable towards the right or towards the left from a neutral position, each of said three-position switches having associated therewith a pair of signal units arranged respectively to the right and to the left of the path of said selector unit, one of said signal units being arranged on actuation by the proper code element members to produce a control signal for shifting the switch to the right and the other signal unit being arranged on actuation by the proper code element members to produce a control signal for shifting the switch to the left.

7. A conveyor system for serving a plurality of processing stations comprising:
   a plurality of trolley carriages,
   an overhead main conveyor comprising a monorail track for said trolley carriages, said track forming a loop having a pair of substantially parallel sides along which the processing stations are distributed, and means for propelling the trolley carriages along said track, said propelling means including a cable or chain slidably supported in guide means provided along said track above the same and having depending dog members for engaging said trolley carriages,
   a plurality of side conveyors coordinated with said processing stations, each of said side conveyors comprising a loop shaped overhead monorail track, each of said substantially parallel sides of the main conveyor being associated with one group of side conveyors to the right of said side and another group of side conveyors to the left of said side,
   switch means for selectively connecting said side conveyors to the main conveyor, said switch means including, for each of said side conveyors, first switch means arranged in a first position to lead a trolley carriage along the main conveyor and in a second position to deviate a trolley carriage from the main conveyor to one end of a side conveyor, and second switch means for connecting the other end of the side conveyor to the same side of the main conveyor as said first switch means, and,
   means for the automatic operation of said first switch means, said automatic operating means comprising switch shifting motor means,
   a control unit for controlling the operation of said motor means,
   a signal unit for activating said control unit, said signal unit being arranged at the side of the path of a carriage approaching said first switch means and having sensing members arranged in positions corresponding to a predetermined code combination, and,
   a selector unit provided on each of the carriages, said selector unit being provided with a set of code element members mechanically adjustable to form any selected one of a plurality of code combinations corresponding each to one of the predetermined code combinations of the sensing members of one of said signal units, said first switch means including at least one three-position switch common to a pair of side conveyors comprising one side conveyor located to the right and another side conveyor located to the left of the track of the main conveyor, said three-position switch being arranged in a first position to lead an arriving carriage straight on along the main conveyor, in a second position to deviate the carriage to the track of said one side conveyor and in a third position to deviate the carriage to the track of said other side conveyor, said selector unit comprising a vertical strip of material attached to the carriage and a vertical row of code element members adjustably supported by said strip of material, each of said code element members comprising a circle ring sector shaped member provided at one end with a radial arm projecting towards the axis of the circle and having a hook-shaped terminal part engaging one edge of said strip so as to maintain the inner rim of said circle ring sector shaped member in engagement with the other edge of said strip, said inner rim being provided with three notches determining respectively a right-hand position, a neutral position and a left-hand position of said circle ring sector shaped member,
   each of said three-position switches having associated therewith a pair of signal units arranged respectively to the right and to the left of the path of said selector unit, one of said signal units being arranged on actuation by the proper code element members to produce a control signal for shifting the switch to the right and the other signal unit being arranged on actuation by the proper code element members to produce a control signal for shifting the switch to the left.

8. A conveyor system for serving a plurality of processing stations arranged in a plurality of substantially parallel rows, comprising:
   a plurality of trolley carriages,
   an overhead main conveyor comprising a monorail track for said trolley carriages, said track forming a loop having a pair of substantially parallel sides along which two rows each of the processing stations are distributed, the processing stations in one row on one side of the respective side being offset in longitudinal direction of said track with respect to the processing stations in the other row on said one side, and means for propelling the trolley carriages along said track, said propelling means including a cable or chain slidably supported in guide means provided along said track above the same and having depending dog members for engaging said trolley carriages,
   a plurality of side conveyors coordinated with said processing stations, each of said side conveyors comprising a loop shaped overhead monorail track, each of said substantially parallel sides of the main conveyor being associated with one group of said conveyors to the right of said side and another group of side conveyors to the left of said side, and,
   switch means for selectively connecting said side conveyors to the main conveyor, said switch means including, for each of said side conveyors, first switch means arranged in a first position to lead a trolley carriage along the main conveyor, in a second position to deviate a trolley carriage from the main conveyor to one end of a side conveyor on one side of said main conveyor, and in a third position to deviate a trolley carriage from the main conveyor to one end of a side conveyor on the other side of said main conveyor, and second switch means for connecting in a first position the other end of the side conveyor on one side of said main conveyor to the same side of the main conveyor as said first switch means in said second position, and in a second position the other end of the side conveyor on the other side of said main conveyor as said first switch means in said third position.

* * * * *